United States Patent [19]

Inoue et al.

[11] Patent Number: 4,479,044

[45] Date of Patent: * Oct. 23, 1984

[54] ELECTRODE ASSEMBLY FOR TRAVELLING-WIRE ELECTROEROSION MACHINE

[75] Inventors: Kiyoshi Inoue, Tokyo; Akihiko Shimizu, Kanagawaken, both of Japan

[73] Assignee: Inoue-Japax Research Inc., Yokohama, Japan

[ * ] Notice: The portion of the term of this patent subsequent to Dec. 22, 1998 has been disclaimed.

[21] Appl. No.: 270,864

[22] Filed: Jun. 5, 1981

Related U.S. Application Data

[62] Division of Ser. No. 897,053, Apr. 17, 1978, Pat. No. 4,307,279.

[30] Foreign Application Priority Data

Apr. 18, 1977 [JP] Japan ................................. 52-44383
Jun. 15, 1977 [JP] Japan ................................. 52-69800
Jul. 11, 1977 [JP] Japan ................................. 52-81961
Aug. 4, 1977 [JP] Japan ................................. 52-92974

[51] Int. Cl.$^3$ .............................................. B23P 1/12
[52] U.S. Cl. ................................. 219/69 W; 219/69 E; 219/69 M
[58] Field of Search ................ 219/69 W, 69 M, 69 E

[56] References Cited

U.S. PATENT DOCUMENTS

| 3,222,494 | 12/1965 | O'Connor | 219/69 E |
| 3,600,547 | 8/1971 | Turner | 219/69 E |
| 3,731,043 | 5/1973 | Ullmann et al. | 219/69 W |
| 3,731,044 | 5/1973 | Ullmann et al. | 219/69 W |
| 3,752,950 | 8/1973 | Castonguay | 219/69 W |
| 3,946,189 | 3/1976 | Pomella et al. | 219/69 W |
| 4,123,645 | 10/1978 | Shichida et al. | 219/69 W |

FOREIGN PATENT DOCUMENTS

| 2644369 | 4/1978 | Fed. Rep. of Germany ... 219/69 W |
| 2140278 | 8/1971 | France . |
| 1331672 | 9/1973 | United Kingdom . |
| 1451135 | 9/1976 | United Kingdom . |
| 475245 | 10/1975 | U.S.S.R. ............................ 219/69 W |

Primary Examiner—Roy N. Envall, Jr.
Assistant Examiner—Geoffrey S. Evans
Attorney, Agent, or Firm—Karl F. Ross; Herbert Dubno

[57] ABSTRACT

A travelling-wire electro-erosion machine which has a head assembly comprising a tubular support formed with a plurality of roller guides positioned to define a path for a travelling wire forming an electrode for electroerosion. Above the tubular support, there is provided a boxlike housing with a supply wheel and a takeup wheel for the wire and a bevel gear on the tubular support cooperates with a pinion on a motor which enables rotation of the entire assembly. A worm-gear arrangement may be used instead of the bevel gears and a different construction of the guide rollers may be provided as well, e.g. on the downwardly extending projection from the tubular body.

17 Claims, 14 Drawing Figures

4,479,044

ELECTRODE ASSEMBLY FOR TRAVELLING-WIRE ELECTROEROSION MACHINE

CROSS REFERENCE TO RELATED APPLICATION

This application is a division of Ser. No. 897,053 filed Apr. 17, 1978, now U.S. Pat. No. 4,307,279.

FIELD OF THE INVENTION

The present invention relates to an electrode assembly for a travelling-wire electroerosion EDM machine.

BACKGROUND OF THE INVENTION

In conventional travelling-wire electroerosion machines, wire-electrode feed assemblies are commonly utilized having a configuration such that the wire electrode fed from a supply reel, which is provided on the machine column or on the frontal wall of the machine, is advanced through one of two arms attached to the machine column or is otherwise fed along said frontal wall to reach the vicinity of an end thereof, wherefrom the wire under tension is advanced via the other of arm for take-up by a take-up reel which is also provided on the machine column.

Electroerosion machines with such travelling electrode assemblies lack flexibility or versatility in that they do not lend themselves to a certain kinds of important applications. for example, they are not amendable to counter-machining of the head portion of an I-shaped member as encountered, for example, in machining of a hollow portion of an extrusion die and an edge portion of a trimming die, and are thus quite inconvenient.

OBJECT OF THE INVENTION

It is, therefore, an object of the present invention to provide an improved electrode assembly for travelling-wire electroerosion machine which permits practically unlimited types of travelling-wire electroerosion machining, especially the difficult applications mentioned above.

Another object of the invention is to provide an improved electro-erosion machine incorporating the herein-proposed new electrode assembly.

SUMMARY OF THE INVENTION

The electrode assembly according to the present invention comprises a base member for mounting thereon a wire-electrode supply member and a wire-electrode take-up member; a plurality of guide members for guiding under tension the travelling-wire electrode along a predetermined path including a machining region comprised of the travelling wire electrode and a workpiece juxtaposed therewith in the presence of a machining medium; a carriage adapted to be coupled rotatably to an arm member mounted displaceably to the electroerosion machine, the carriage carrying said base member and including a support member for supporting and positioning at least in part of the guide members at predetermined locations; drive means for advancing the wire electrode from the supply member to the take-up member along said predetermined path; and a rotary mechanism operable in response to a control signal for rotating said carriage to control the angular position thereof relative to said arm member.

A pair of electrode guides are included in the guide members and are arranged preferably such that the axis of that portion of the wire electrode which is juxtaposed with the workpiece in the machining region coincides with the rotary axis of said carriage.

In order to allow taper-cutting of workpieces, said support member has an electrode-guide holder portion which holds a plurality of guides relatively displaceable in mutually orthgonal directions to variably set the inclination of the wire electrode guided thereby and the workpiece surface juxtaposed therewith. Alternatively, a plurality of such holders or wireguide units having different angular and other wire-spanning configurations may be prepared in order that they may be replaceablly attached to said support member or carriage for different machining purposes as desired.

In accordance with a further aspect of the present invention, there is provided an improved electroerosion machine which incorporates at least one travelling-wire electrode assembly the aforedescribed of which at least part is carried in a tool storage magazine which also carries a plurality of three-dimensional or cavity-sinking electroerosion electrodes diverse in shape and size and is provided with an automatic tool changing unit for any desired machining operation on fully automatic basis and with utmost efficiency.

BRIEF DESCRIPTION OF THE DRAWING

These and other objects, features and advantages of the invention will become more readily apparent from the following description of certain embodiments thereof with reference to the accompanying drawing in which.

SPECIFIC DESCRIPTION

Figure 1:
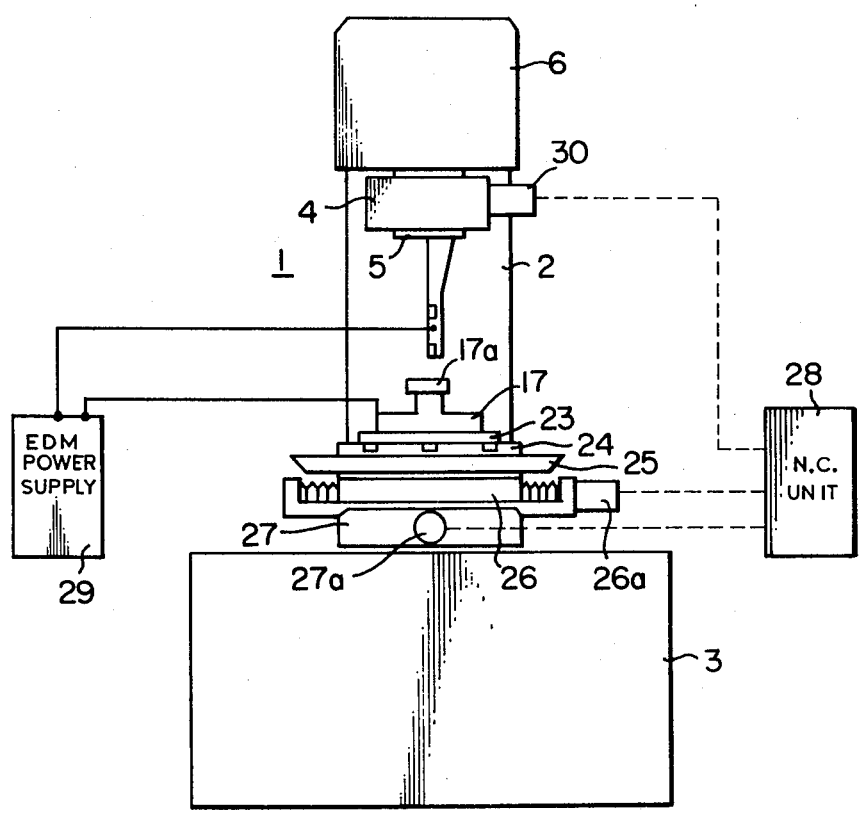
FIG. 1 is a front-elevational view of a travelling-wire electroerosion machine including an electrode assembly according to the invention.
Figure 2:
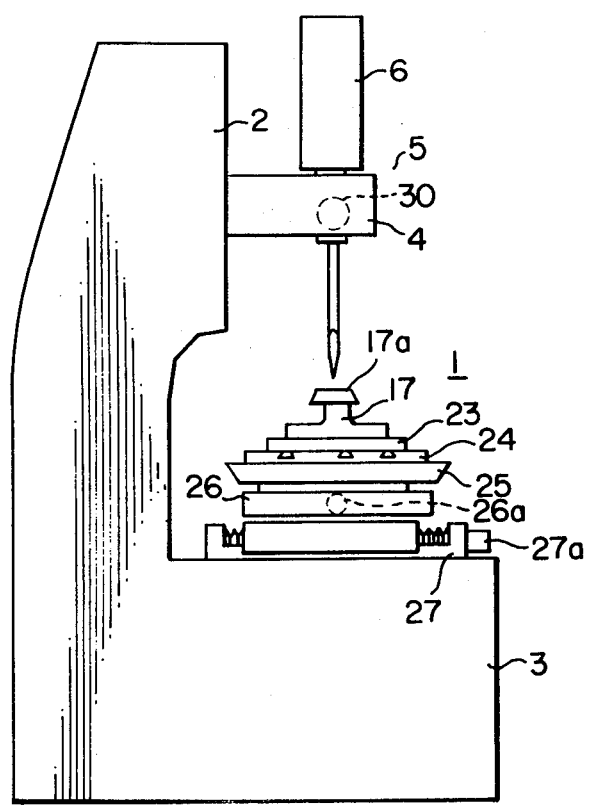
FIG. 2 is a side elevational view of the machine of FIG. 1.

Referring now to FIG. 1 and 2, there is shown diagrammatically an electroerosion machine 1 having a column 2 standing upright from a machine bed 3 as in conventional designs. The machine 1 has a tool arm 4 mounted to be vertically displaceable on the column 2. The tool arm 4 is here designed to carry an electrode assembly 5, according to the invention to be described in detail hereinafter and is brought up and down to a position where electroerosion is to be carried out with the machining portion of the electrode assembly 5.

Figure 3:
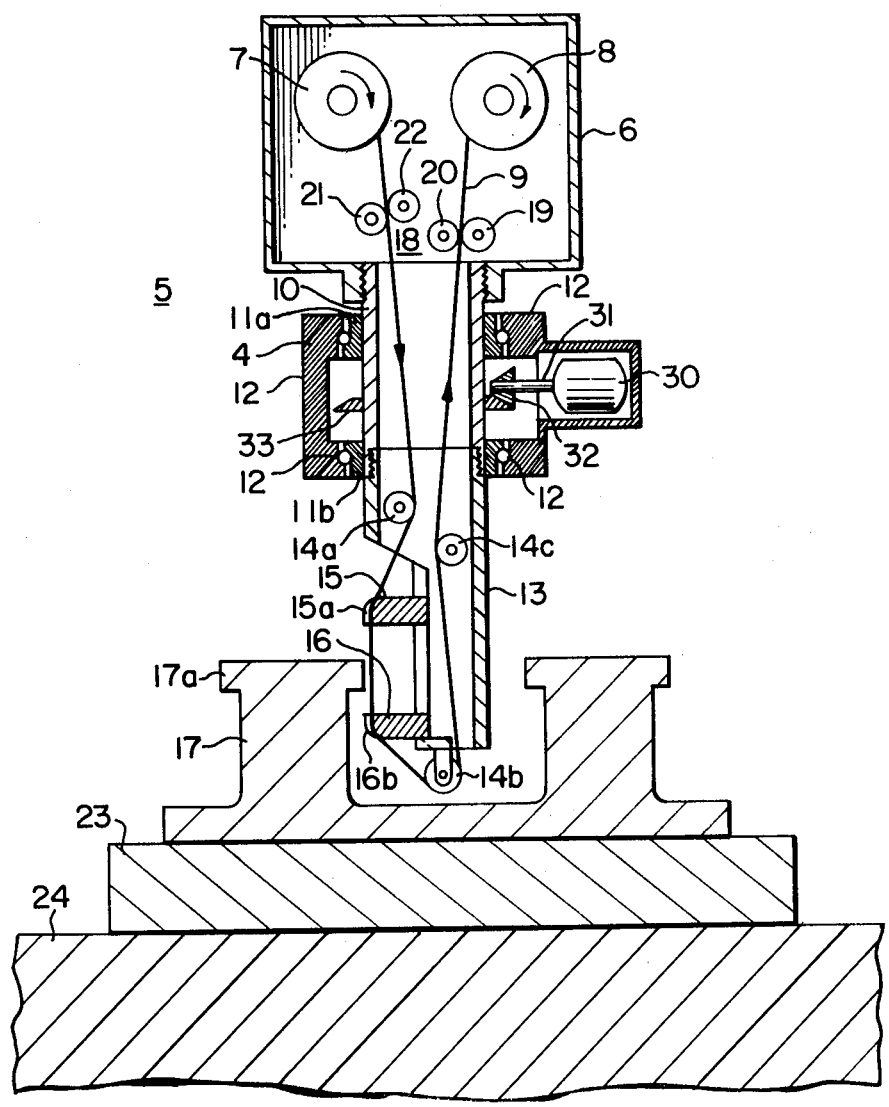
FIGS. 3 to 8 illustrate in sectional view various embodiments of the electrode assembly according to the invention.

Referring to FIG. 3, the electrode assembly 5 comprises a base 6 which may be in the form of a basket, casing, board or plate and has a supply reel 7 and a take-up reel 8 mounted on the base for a wire electrode 9. Shown threadedly fixed to the base 6 is a cylinder 10 received in a pair of rings 11a and 11b which are in turn rotatably received through bearings 12 within the tool arm 4 which has been shown in FIGS. 1 and 2. Shown also threadedly fixed to the cylinder 10 is a support arm 13 which carries a plurality of guide rollers 14a, 14b, 14c and further holds a pair of electrode guides 15 and 16 each having a guide groove 15a, 16b for the wire electrode 9 to cause it to smoothly run closedly in juxtaposition with a workpiece 17. The cylinder 10 forms a carriage for the base 6 and the support arm 13. Drive means for displacing the wire electrode 9 under sufficient tension for displacing the wire electrode 9 here mounted on the base 6 under sufficient tension and comprises a drive roller 19 and a pinch roller 20 therefor and a brake roller 21 and a pinch roller 22 therefor. These driving and braking elements are well known in the art and may take any form which is conventional.

The workpiece 17 is shown mounted on a current-conducting plate or table 23 which is in turn mounted on a main table 24. The main table 24 is in turn placed in a work tank as in conventional practice. As shown in FIGS. 1 and 2, X-Y cross tables 26 and 27 on which the work tank 25 is mounted are provided which are driven by X-axis feed motor 26a and Y-axis feed motor 27a through their respective lead screws in response to drive control signals fed from a numerical control unit 28 to displace the workpiece 17 along a predetermined path.

A power supply for applying an electric energy between the workpiece 17 (through the plate 23) and the wire electrode 9 (through, for example, the guide 14b) is designated at 29 in FIG. 1. While a cutting operation is being carried out, a machining fluid (e.g., distilled water) is supplied to the cutting region to serve as a machining medium and also to remove eroded material from the cutting zone.

The workpiece 17 is here a hollow body of which upper overhung portion (annular) 17a is to be machined and the area in which machining is carried out will not be sifficiently wide relative to the size of the wire-electrode support arm 13 so that the displacement of the workpiece 17 may be disturbed by contact or collision with the arm 13. The difficulty is overcome by changing the orientation of the arm 13 relative to the workpiece 17 as the machining proceeds. To this end, a rotary mechanism for the carriage 10 is provided including a motor 30 the end of whose drive shaft 31 is provided with a bevel gear or worm 32 which is in engagement with a bevel gear or worm wheel 33 attached around the cylinder 10. Thus, the rotation of the carriage 10 is effected responsive to the rotation of the motor 30, which in turn operates in response to drive signals from the NC unit 28 (FIG. 1) programmed or generated therein in conjunction with X-axis and Y-axis feed signals to displace the workpiece 17 in a predetermined cutting path along its upper overhung portion 17a.

Figure 4:
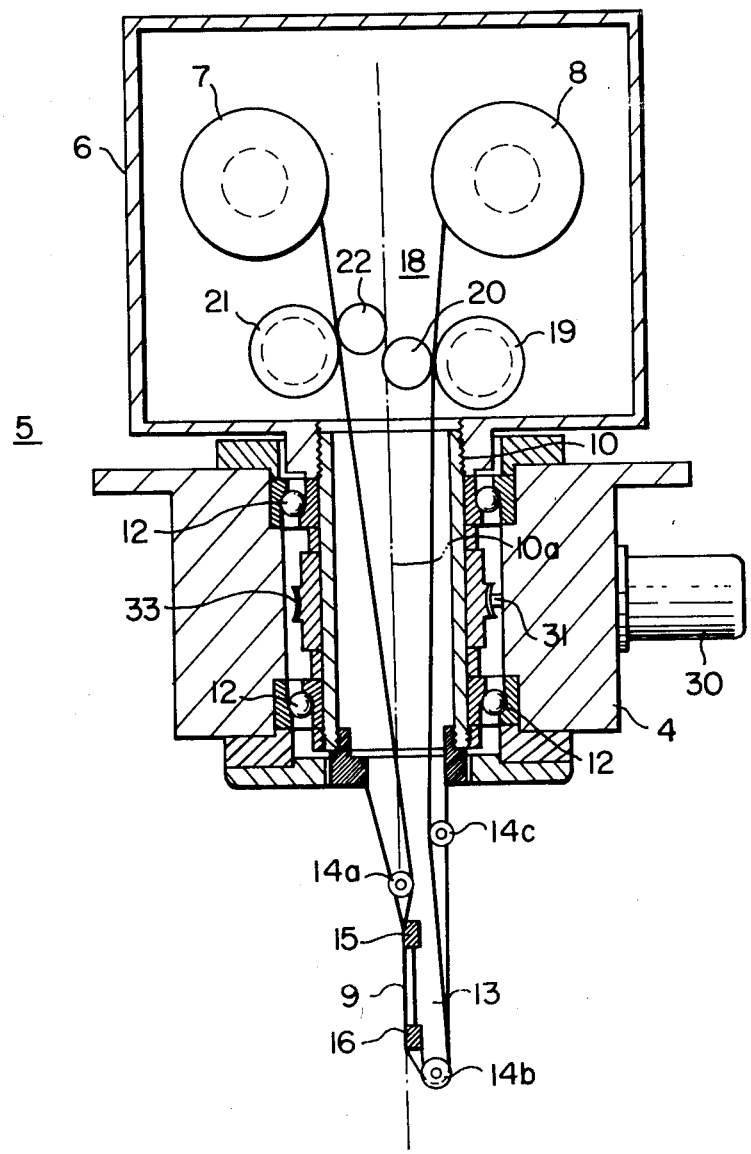

In FIG. 4 there is shown a modified assembly of the embodiment described in which the rotary axis 10a of the carriage 10 is made in agreement with the axis of the wire-electrode 9 between the guides 15 and 16. With such arrangement, as will be seen, it is possible to establish any angular position of orientation of the carriage 10 without interfering relative positions between the axis of the machining wire-electrode 9 and the workpiece 17; hence programming and control are greatly facilitated.

Figure 5:
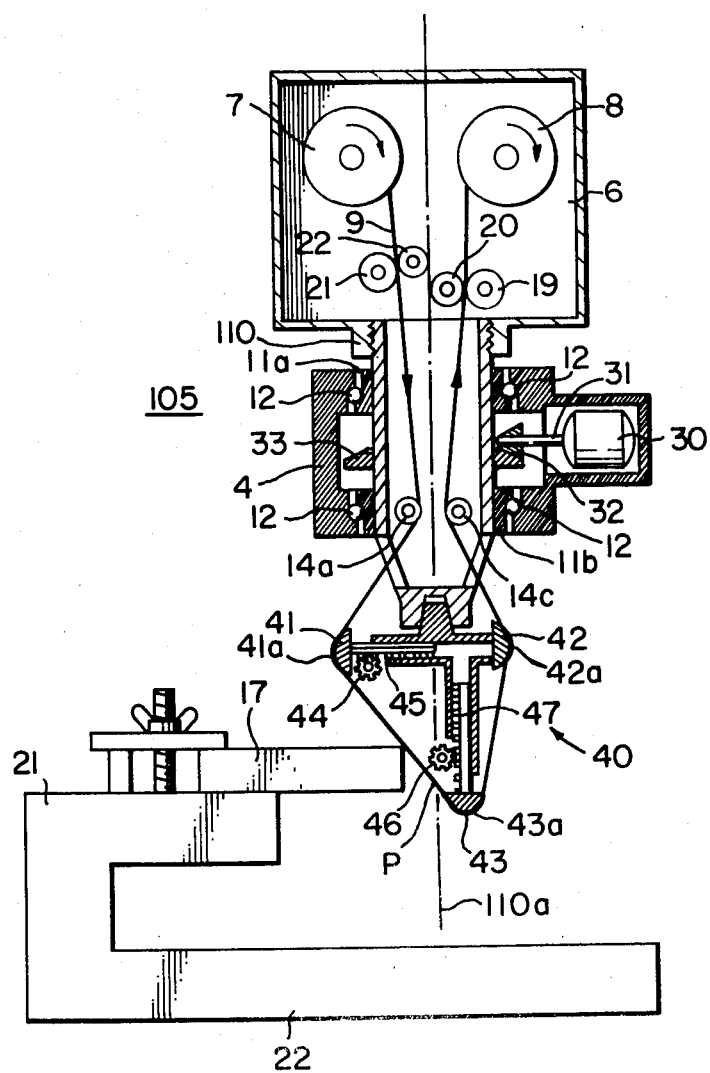

An embodiment 105 of the invention shown in FIG. 5 in which the same reference numerals designate respectively the same or similar parts in the previous embodiments, makes use of a carriage 110 with a frusto-conical lower part which is adapted to detachably hold a wire-electrode guide fixture 40 comprising guides 41, 42 and 43 provided respectively with guide grooves 41a, 42a and 43a. In this case, the guide 41 is provided with a rack 44 and a pinion 45 in engagement therewith while the guide 43 is provided with a rack 46 and a pinion 47 in engagement therewith so that the guide 41 and the guide 43 are displaceable in the horizontal and vertical directions, respectively. This arrangement enables the axis of the wire-electrode 9 in the machining region to be inclined at a desired angle with respect to the workpiece 17, thus permitting a taper-cutting counter-machining operation to be carried out at a desired and variable inclination. It should be noted here that the rotary axis 110a of the carriage 110 and the wire electrode 9 are arranged to cross each other between the guides 41 and 43 so that when a reference surface is established on or in the workpiece 17, the cross point P is caused to move along a counter-machining path on the reference surface through displacement of the cross tables 26 and 27. Such reference surface is typically set at the lower surface of the workpiece 17 although, when the cross point P is located in the vicinity of the guide 41, it may be at the upper surface of the workpiece 17.

Figure 6:
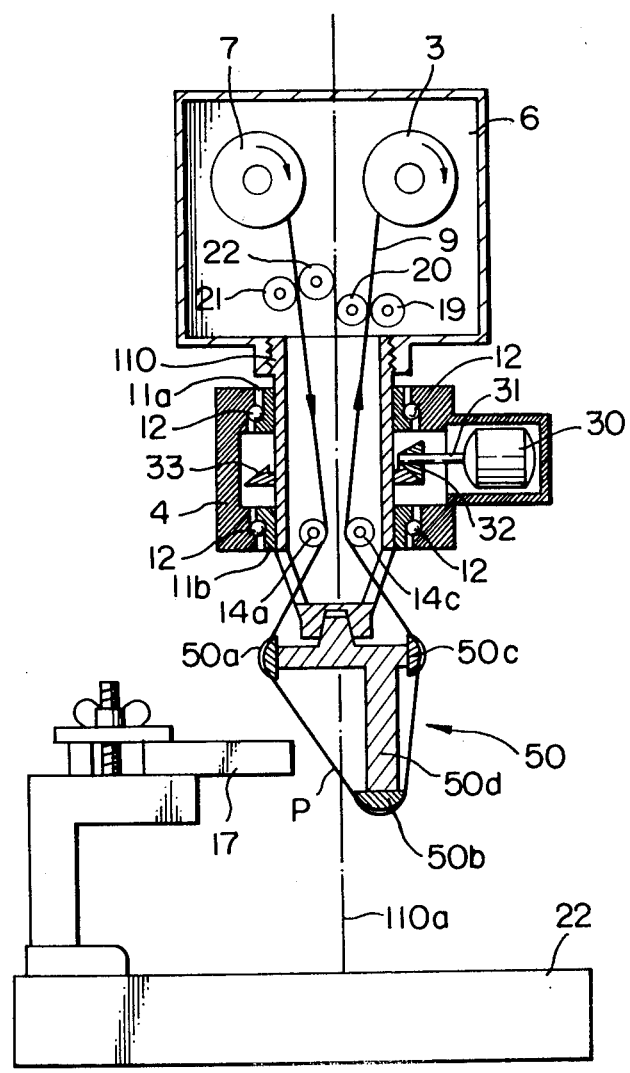
Figure 7:
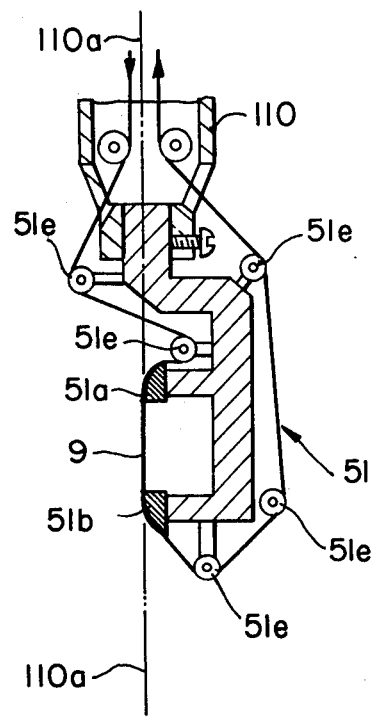
Figure 8:
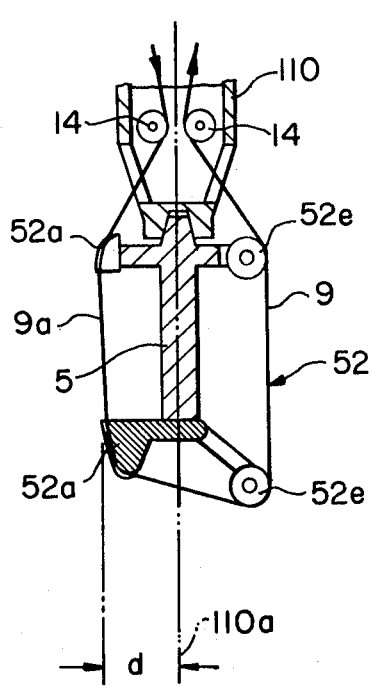

The system of FIG. 6 is designed to use various electrode guide fixtures to be attached to the carriage 110 depending on particular machining purposes. Thus, in lieu of the fixture there shown which is similar in configuration to that of FIG. 5 but with three guides 50a, 50b and 50c all fixed to a supporting arm 50d, the fixture 51 and 52, illustrated in FIGS. 7 and 8, for example, may be mounted on the carriage 110. The fixture 51 represents a tool holder utilized in straight-cutting operations and includes guides 51a and 51b adapted to locate the wire electrode 9 in agreement with the rotary axis 110a of the carriage 110 for the purpose already mentioned and a plurality of wire electrode spanning and stretching rollers 51e. The fixture 52 represents a tool holder likewise for straight cutting but with a shift d in relation to a programmed path and comprises wire electrode guides 52a and 52b locating the machining wire electrode 9a with a distance d spaced from the rotary axis 110a of the carriage 110 and also includes guiding rollers 52e as well. Conveniently, units with predetermined but different shifts of this type may be prepared.

FIGS. 9, 10, 11 and 12 illustrates a system of the invention which may eliminate a particular NC program for controlling the angular position of the carriage in order to avoid collision of the electrode assembly with the workpiece by providing contact probes in association with the electrode assembly.

Figure 10:
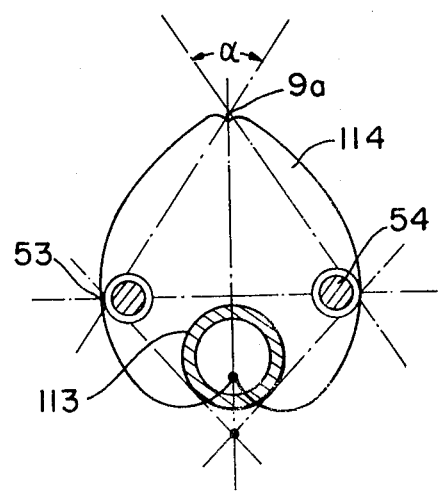
FIG. 10 is a cross-sectional view of the electrode assembly taken along the line X—X in FIG. 9.
Figure 9:
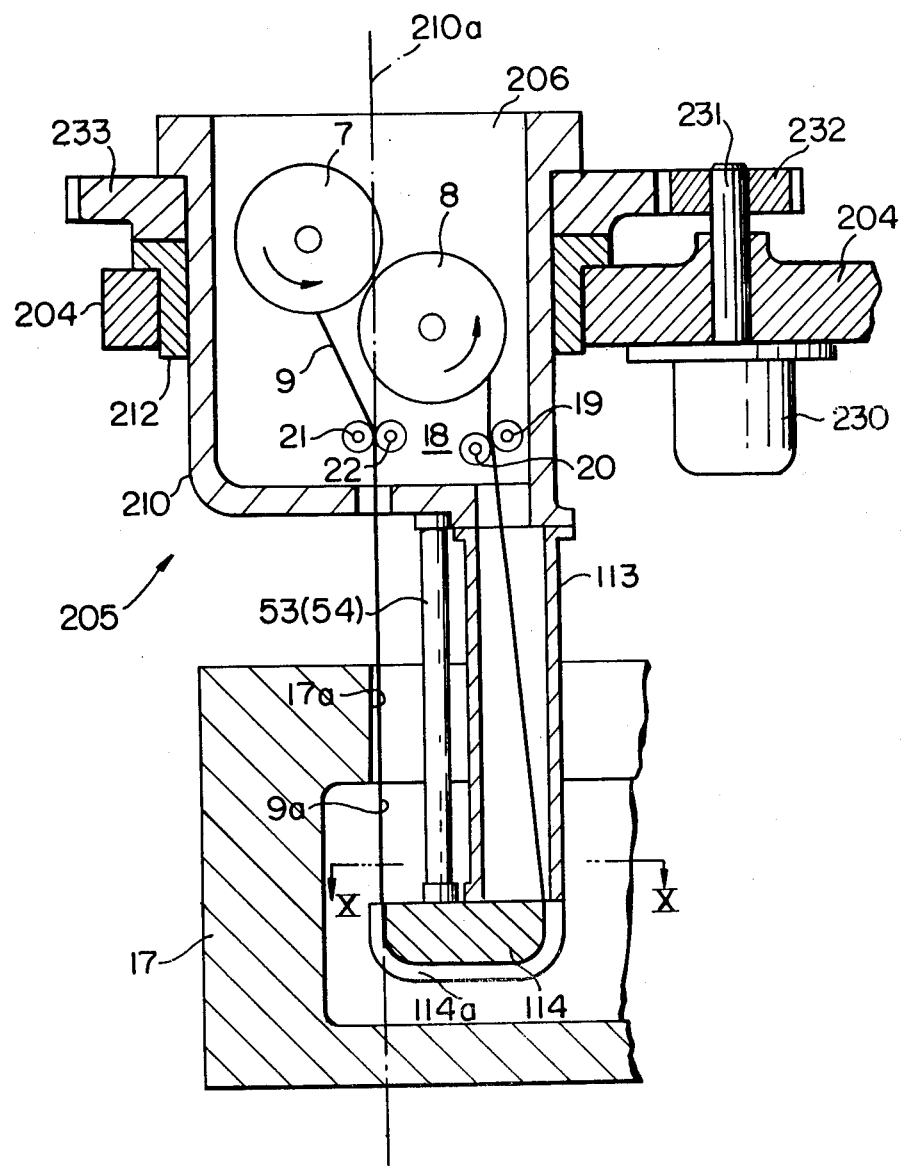
FIG. 9 is a sectional view illustrating a further embodiment of the invention.

In FIG. 9 the electrode assembly 205 includes a carriage 210 which as in the previous embodiments is rotatably received via a bearing 212 in a tool arm 204 corresponding to the arm 4 in FIGS. 1 and 2. The carriage 210 is also provided with a spur gear 233 in engagement with a spur gear 232 attached at the end of shaft 231 of a pulse motor 230 so that the operation of the latter causes an incremental rotation of the carriage 210 about the rotary axis 210a. In this embodiment, a base 206 carrying a supply reel 7 and a take-up reel 8 for the wire electrode 9 and a wire-drive unit 18 is received within the carriage 210, the latter having a cylindrical guide arm 113 projecting downwardly therefrom and ending at a guide 114 formed with a guide groove 114a. Further there are provided a pair of electrically conductive probes 53 and 54 insulated from the wire electrode 9 extending between the lower end of the carriage 210 and the guide 114 in such a manner that they locate side by side symmetrically with each other from the plane containing the central axis of the guide arm 113 and the rotary axis 210a of the carriage 210 (or the wire electrode 9) as shown in FIG. 10. The probes 53 and 54 are preferably located at positions closer to the guide arm 113 than the rotary axis 210a and such that the spacings between their outer surfaces and the rotary axis 210a do not each exceed the spacing between the rotary axis 210a and the outer surface of the guide surface 113 as shown. In this embodiment, too, the axis of the wire electrode 9 spanning between the guide 114 and the other guide here formed by rollers 21, 22 coincides with rotary axis 210a of the unit 210.

In other words, referrnng to FIG. 10, the probes 53 and 54 are arranged at locations such that the apex a of a square in which the wire electrode 9a, the probes 53 and 54 and the guide arm 113 are inscribed is of an acute angle and the wire electrode 9a is positioned closer to the probes 53 and 54 than the guide arm 113.

Figure 11:
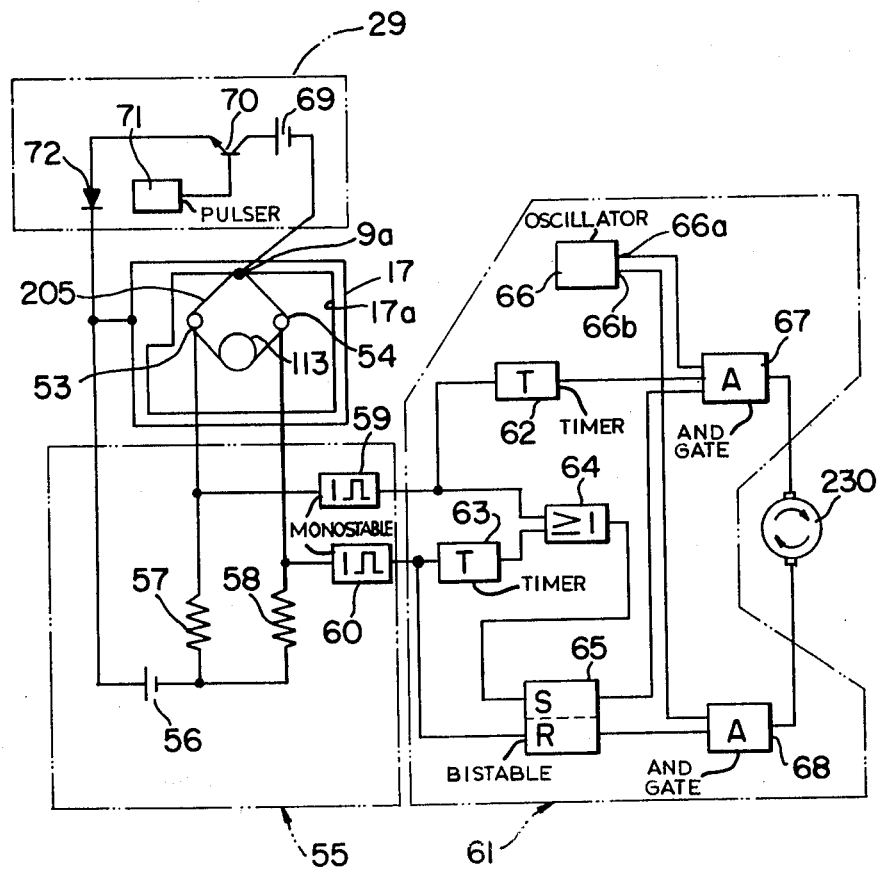
FIG. 11 is a circuit diagram partly in block form of a system for use in conjunction with the electrode assembly of FIGS. 9 and 10.

With reference to FIG. 11 in which a system operating with probes 53 and 54 in FIGS. 9 and 10 is shown, a sensing circuit 55 comprises a DC source 56, resistors 57 and 58, and monostable elements 59 and 60 whereas a rotation control circuit 61 for the carriage 210 includes timers 62 and 63, and OR gate 64, an RS bistable element 65, an oscillator 66 and AND gates 67 and 68. A machining power supply 29 (FIG. 1) is also shown comprising a DC source 69, a switching element 70, a pulser 71 and a diode 72 in a scheme well known in the art for applying a series of electrical pulses between the wire electrode 9a and the workpiece 17.

Figure 12:
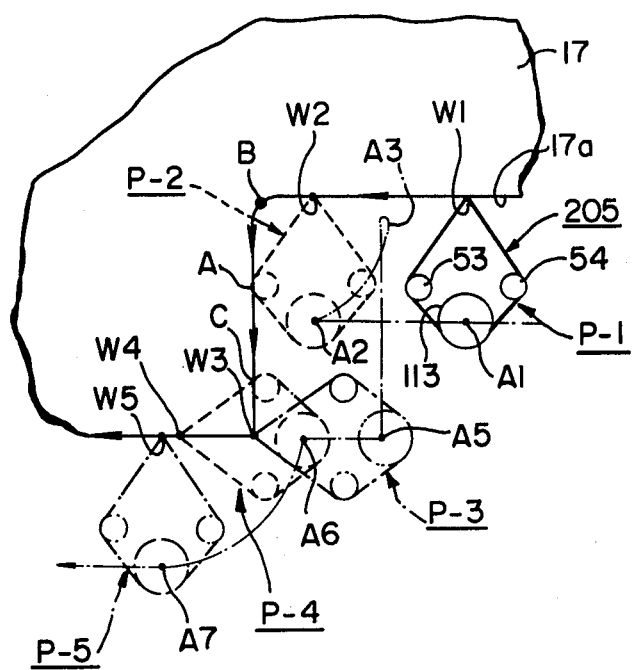
FIG. 12 is a diagrammatic view of a trace of the electrode assembly of FIGS. 9 and 10 in machining a workpiece under control by the system of FIG. 11.

Referring to FIGS. 11 and 12, the electrode assembly 205 is shown in the form of a square form in section by the wire electrode 9a, the guide arm 113 and the probes 53 and 54 and operating in machining the overhung portion 17a of a workpiece 17. While actually the axis of the wire electrode 9a lies always at a fixed position and the workpiece 17 is desplaced with respect thereto, the description below will treat the wire electrode 9a, as if it moved relative to the fixed workpiece 17 for the sake of clarity and convenience of explanation.

Assuming that the electrode assembly 205 is now located at a position indicated by P-1, the wire electrode 9a is located at a point W1.

When neither of probes 53 and 54 is in contact with the workpiece 17, there will be no current flow through resistors 57 and 58 so that only an "0" signal appears at the outputs of monostable elements 59 and 60, and timers 62 and 63 while the RS bistable element is under "set" condition.

When one of the probes 53 comes in contact with the workpiece 17 at a point A, there develops a current flow through the resistor 57 which triggers the monostable element 59 whose output in turn brings the timer 62 into operation. Then, if the bistable element 65 has been under "reset" condition it will be brought to "set" state. The timer 62 provides a "1" signal for a predetermined time period following its actuation in which period output pulses supplied from the output terminal 66a of the oscillator 66 are permitted to pass through the AND gate 67 for delivery to rotate the pulse motor 230. The electrode assembly 205 at a position P-2 is thereby rotated counterclockwise while the wire electrode 9a continues to move from the position W2 through a point B toward a point A so that collision or interference between the workpiece 17 and the guide arm 113 is avoided.

As is appreciated, the operating time of the timer 62 and the output frequency of the oscillator 66 are set so as to cause the electrode assembly 205 to rotate by 90 degrees until the wire electrode 9a moves from the position W2 through the point B to reach the point A. This will enable the electrode assembly 205 after having machined the corner portion to stand straight in parallel to the position indicated by the chain line. Thereafter, the unit 205 as so oriented will be displaced downwardly toward the position P-3 and then from the position W3 to the left to machine the portion to reach the point W4.

When the assembly 205 reaches the dash line indicated at P-4, the probe 54 will come in contact with the workpiece 17. In FIG. 11, an electric current is thereby caused to flow through the resistor 58 to trigger the monostable element 60 permitting an output pulse to be delivered. The output pulse acts to bring the RS bistable element 65 into "reset" condition and also to actuate the timer 63. The timer 63 acts as a delay circuit delivering after the lapse of a predetermined time period a short output pulse which returns the RS bistable element 65 into "set" condition. While the bistable element 65 is being under the "reset" condition, pulses outgoing from the terminal 66b of the oscillator 66 are permitted to pass through the AND gate 68 thereby causing the motor 230 to rotate in the direction opposite to that mentioned previously. Here, pulses delivered from the output terminal 66b are set to be of a higher frequency than those from the output terminal 66a so that the assembly 205 is rotated by 90 degrees clockwise during the short time in which the wire electrode 9a is displaced from the position W4 to W5. The short pulse from the timer 63 will then return the bistable element 65 to terminate the rotation of the motor 230. In the meantime, the guide arm 113 is displaced drawing an arc from the point A6 to the point A7. In this manner, machining can be carried out throughout the entire path of the periphery of the overhung portion 17a of the workpiece 17 without collision or interference between the guide arm 113 and the workpiece 17.

Figure 13:
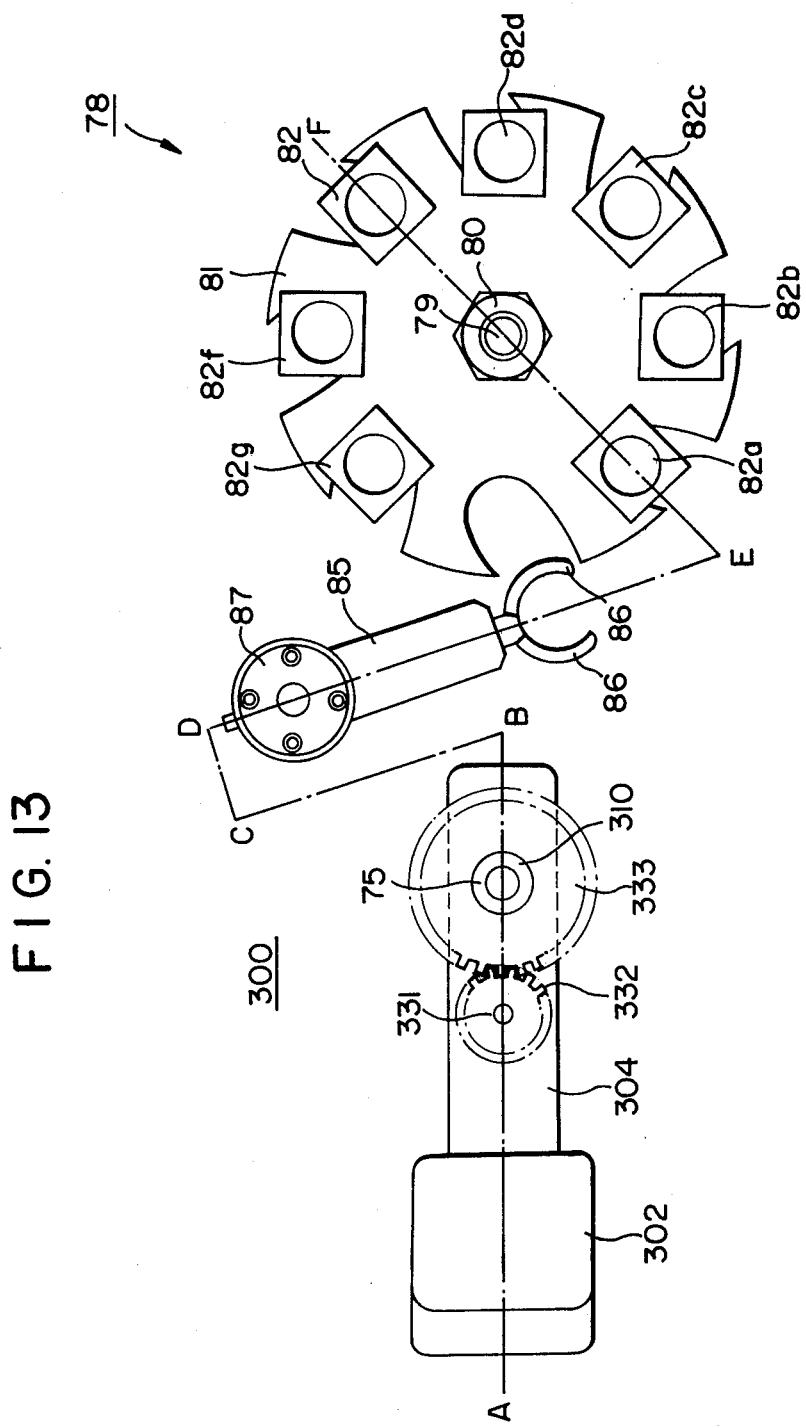
FIG. 13 is a plan view of an improved electroerosion machine incorporating an automatic tool changer and a tool magazine carrying an electrode assembly according to the invention as well as various cavity-sinking electrodes.
Figure 14:
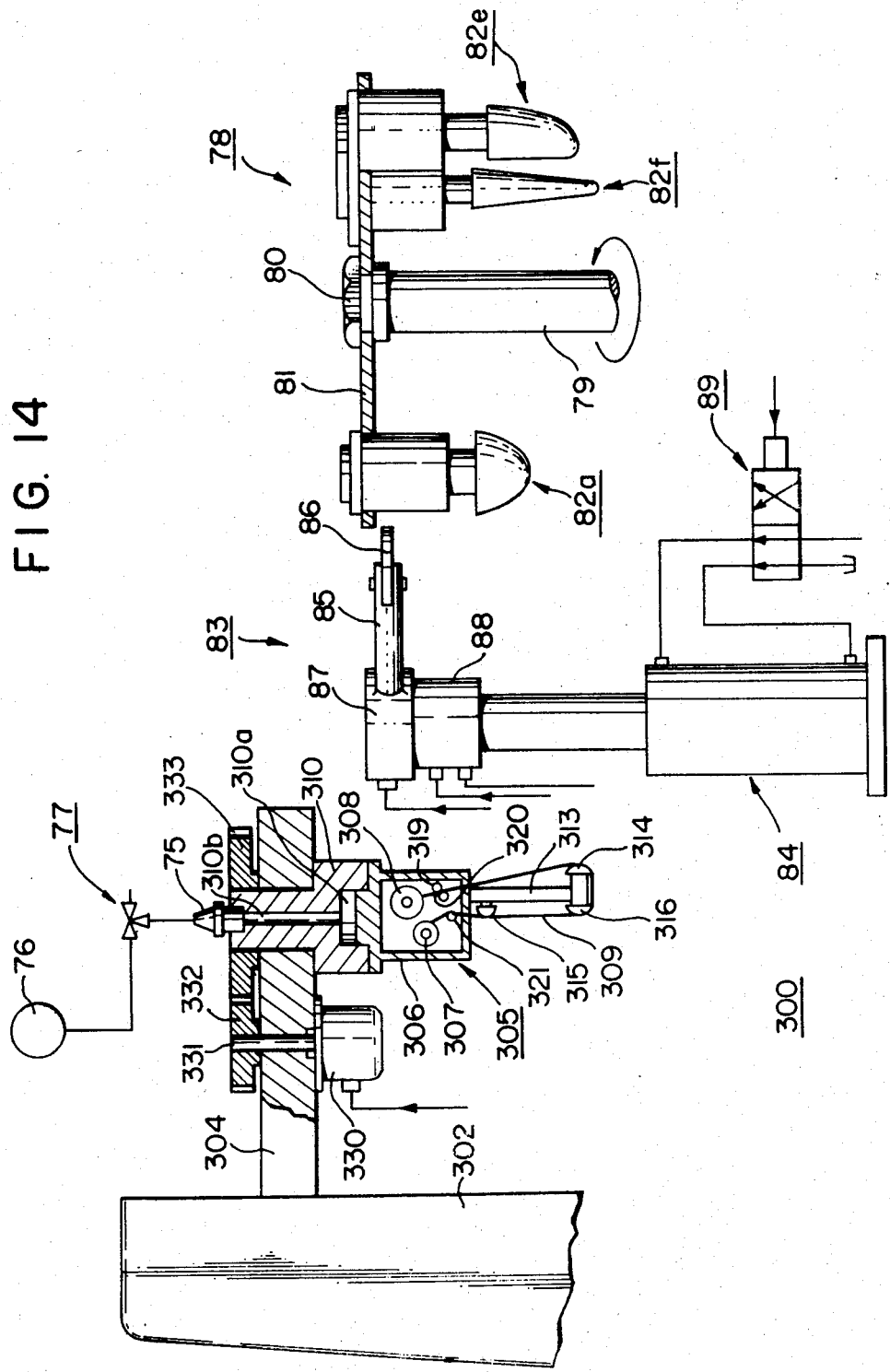
FIG. 14 is a side view diagrammatically showing the machine taken along the lines ABCD in FIG. 13.

In FIGS. 13 and 14, there is shown, in accordance with a further aspect of the invention, a novel electroerosion machine 300 incorporating a wire-electrode assembly 305. Here again, the assembly comprises a base member 306 carrying a supply reel 307 and a take-up reel 308 for a travelling wire electrode 309 and detachably mounted to a carriage 310 which in turn is rotatably received in a tool arm 304 with a motor 330 transmitting a rotary motion to the carriage 310 via a drive shaft 331 and spur gears 332 and 333 in the manner described previously. The tool arm 304 is mounted on a column 302 of the machine 330 having X-Y cross tables and is arranged to be displaceable up and down to establish machining and preparatory positions in the vertical direction (FIGS. 1 and 2). The wire electrode 309 is transported under tension by means of drive and brake roller arrangements 319, 320 and 321 over guides 314, 315 and 316 attached to a support arm 313 which in turn is mounted to the base member 306.

The carriage 310 is provided with a vacuum compartment 310a communicating via a duct 310b with a universal joint 75 which in turn communicates with a vacuum pump 76 via a three-way valve 77 so that they constitute a vacuum retainer for the unit 305 and other electrodes to be presented to the carriage 310.

Further provided in this embodiment is a tool storage magazine 78 rotatably supported by a shaft 79 with a nut 80 and having a rotary table 81 which carries diverse electroerosion electrodes 82a, 82b, 82c, 82d 82e, 82f 82g to be successively utilized for drilling and/or cavity-sinking operations.

A tool changer 83 in this embodiment comprises a hydraulic cylinder 84, a rotary arm 85 having at its free end a grip 86 for holding and transferring tools 82a–82g from the tool storage magazine 78 to the carriage 310, a head 87 supporting the tool transfer arm 85 and a hydraulic cylinder 88 for rotating the head 87. The hydraulic cylinder 84 is supplied via a four-way valve 89 with a high-pressure operating fluid to make adjustment of the vertical position of the rotary arm 85 at a predetermined level in conjunction with levels of the rotary table 81 and the carriage 310. The opening and closure operation of the grip 86 is effected by a known hydraulic or electromechanical device contained in the head 87 to receive a particular tool electrode from the magazine 78 and to present it to the carriage 310 upon rotation of the arm 85 to the position thereof.

The rotation of the electrode magazine 78, the operation of the tool changer 83, the vertical displacement of the tool arm 304, the rotation of the carriage 310 and the switching of the three-way valve 77 are all controlled by a central control unit (not shown). Tool electrodes 82a to 82g carried by the magazine 78 are successively transferred and successively replaced by the tool changer 83 in the order or their arrangement to and from the carriage 310 in a scheme well known in the field of machine tools.

There is thus provided a novel electrode assembly for a travelling-wire electroerosion machine as well as a novel electroerosion machine which permits diverse machining applications which have been hitherto only achieved, with difficulties and inconvenience.

We claim:

1. An electrode head assembly for a travelling-wire electroerosion machine, said assembly comprising:
a base member carrying thereon an electrode-wire supply member and an electrode-wire take-up member;
a plurality of wire guide members for guiding under tension between said supply and take-up members an electrode wire along a predetermined path including a machining region which is, in the use of the assembly, comprised of the travelling electrode wire and a workpiece juxtaposed therewith in the presence of a machining medium;
a wire carriage adapted to be coupled rotatably to an arm member mounted for displacement on the electroerosion machine, said carriage carrying said base member and including a support member carrying at least some of said wire guide members at predetermined locations;
wire drive means for advancing said electrode wire from said supply member to said take-up member along said predetermined path; and
rotary means operable in response to a control signal for enabling said carriage to be rotated to control the angular position thereof relative to said arm member in a manner such as will avoid collision of any part of said support member with said workpiece when said electrode wire and said workpiece are transversely moved relative to each other along a predetermined machining course.

2. An electrode head assembly for a travelling-wire electroerosion machine, said assembly comprising:
a base member carrying thereon a wire-electrode supply member and a wire-electrode take-up member;
a plurality of guide members for guiding under tension between said supply and take-up members a travelling-wire electrode along a predetermined path including a machining region which is, in the use of the assembly, comprised of the travelling-wire electrode and a workpiece juxtaposed therewith in the presence of a machining medium;
a carriage adapted to be coupled rotatably to an arm member mounted for displacement on the electroerosion machine, said carriage carrying said base member and including a support member carrying at least some of said guide members at preselected locations;
wire drive means for advancing said wire electrode from said supply member to said take-up member along said predetermined path; and
rotary means operable in response to a control signal for rotating said carriage to control the angular position thereof relative to said arm member, said guide members carried by said support member being arranged so as to position said wire electrode in said machining region parallel with, but spaced from, the rotary axis of said carriage.

3. An electroerosion machine comprising:
a column;
a tool arm carried by said column to be vertically displaceable relative thereto;
a carriage rotatably carried by said tool arm;
a tool storage magazine carrying diverse electroerosion tool electrodes including at least one unit of a base member and a support member of an electrode assembly, which assembly comprises: said base member carrying thereon a wire-electrode supply member and a wire-electrode take-up member, a plurality of guide members for guiding under tension between said supply and take-up members a travelling-wire electrode along a predetermined path including a machining region which is, in the use of assembly, comprised of the travelling-wire electrode and a workpiece juxtaposed therewith in the presence of a machining medium, said carriage adapted to be coupled rotatably to said tool arm, said carriage carrying said base member and including said support member carrying at least some of said guide members at preselected locations, wire drive means for advancing said wire electrode from said supply member to said take-up member along said predetermined path, and rotary means operable in response to a control signal for rotating said carriage to control the angular position thereof relative to said arm member, said guide members carried by said support member being arranged so as to position said wire electrode in said machining region parallel with, but spaced from, the rotary axis of said carriage; and an automatic tool changer for successively transferring and replacing said diverse tool electrodes in said magazine for successive machining operations.

4. An electrode head assembly for mounting on a vertically-displaceable tool arm of a travelling-wire electroerosion machine, said assembly comprising:
   (a) a base member carrying thereon electrode wire-supply and take-up members between which, when said assembly is in operation on said machine, an electrode wire extends under tension;
   (b) a plurality of guide members for guiding said electrode wire under tension along a predetermined path which extends between said supply and take-up members and which traverses a machining region into which a workpiece for electroerosion machining is introduced in an electroerosion machining relationship with said electrode wire;
   (c) wire driving means for advancing said electrode wire along said path from said supply member to said take-up member;
   (d) a carriage arranged to be rotatably supported on said tool arm and to carry said base member and a support member, said support member including as a part thereof at least some of said guide members at predetermined locations along said path; and
   (e) carriage rotation means secured to said carriage for enabling said carriage, when rotatably supported in said tool arm, to be rotated relative to that tool arm in a manner such as will avoid mechanical interference of any part of said support member with said workpiece when said electrode wire and said workpiece are transversely displaced relative to each other along a predetermined machining course.

5. An electrode head assembly for mounting on a vertically-displaceably tool arm of a travelling-wire electroerosion machine, comprising:
   (a) a base member carrying thereon electrode wiresupply and take-up members between which, when said assembly is in operation on said machine, an electrode wire extends under tension;
   (b) a plurality of guide members for guiding said electrode wire under tension along a predetermined path which extends between said supply and take-up members and which traverses a machining region into which a workpiece for electroerosion machining is introduced in an electroerosion machining relationship with said electrode wire;
   (c) wire driving means for advancing said electrode wire along said path from said supply member to said take-up member;
   (d) a carriage arranged to be rotatably supported on said tool arm and to carry said base member and a support member, said support member including as a part thereof at least some of said guide members at predetermined locations along said path; and
   (e) carriage rotation means secured to said carriage for enabling said carriage, when rotatably supported in said tool arm, to be rotated relative to that tool arm in a manner such as will avoid mechanical interference of any part of said support member with said workpiece when one of said electrode wire and said workpiece is guided relative to the other along a predetermined machining course, said vertically-displaceable tool arm being displaceably carried on a column of the machine, said assembly having said carriage of its own rotatably supported on said tool arm; said machine having carriage driving means carried on said tool arm and arranged to co-operate when energized to rotate said carriage relative to said tool arm in a manner such as will avoid interference of at least one of said support member, and a guide member carried thereby, with said workpiece when one of said electrode wire and said workpiece when one of said electrode wire and said workpiece is guided relative to the other along said predetermined machining course; and means for energizing said carriage driving means as required so as to avoid said interference.

6. A travelling-wire electroerosion machine, comprising:
   (a) a vertically-displaceably tool arm;
   (b) an electrode head assembly having:
      (b1) a base member carrying thereon electrode wire-supply and take-up members between which, when said assembly is in operation on said machine, an electrode wire extends under tension,
      (b2) a plurality of guide members for guiding said electrode wire under tension along a predetermined path which extends between said supply and take-up members and which traverses a machining region into which a workpiece for electroerosion machining is introduced in an electroerosion machining relationship with said electrode wire,
      (b3) wire driving means for advancing said electrode wire along said path from said supply member to said take-up member,
      (b4) a carriage arranged to be rotatably supported on said tool arm and to carry said base member,
      (b5) a support member carried by said carriage means and including as a part thereof at least some of said guide members at predetermined locations along said path, and
      (b6) carriage rotation means secured to said carriage for enabling said carriage, when rotatably supported in said tool arm, to be rotated relative to that tool arm in a manner such as will avoid mechanical interference of any part of said support member with said workpiece when said electrode wire and said workpiece are transversely moved relative to each other along a predetermined machining course, said tool arm being displaceably carried on a column of the machine, said assembly having said carriage of its own rotatably supported on said tool arm;
   (c) carriage driving means carried on said tool arm and arranged to co-operate when energized to rotate said carriage relative to said tool arm in a manner such as will avoid interference of at least one of said support member, and a guide member carried thereby, with said workpiece when said electrode wire and said workpiece are transversely moved relative to each other along said predetermined machining course;
   (d) means for energizing said carriage driving means as required so as to avoid said interference, said electrode head assembly, said support member and said base member constituting a unit which is removable at will from said carriage;
   (e) means for retaining said unit operatively coupled with said carriage for performing machining operations using that unit, and releasing that unit for removal from said carriage after such operations have been performed;

(f) a tool storage magazine in which are stored diverse other electroerosion tool electrodes for transfer to and use in said carriage; and (g) an automatic tool changing means arranged to transfer said unit or any other tool electrode previously exchanged therewith from said carriage into said storage magazine, and to replace the transferred tool electrode by another tool electrode selected from those stored in said storage magazine, whereby electroerosion machining processes using said unit or any of said stored tool electrodes may be carried out in sequence.

7. A travelling-wire electroerosion machine comprising:
(a) a column;
(b) a vertically-displaceable tool arm displaceably carried on said column and adapted to receive and support a tool electrode for performing electroerosion machining operations on a workpiece;
(c) an electrode head assembly for mounting on said tool arm, including:
   (c1) a base member carrying thereon electrode wire-supply and take-up members between which, when said assembly is in operation on said machine, an electrode wire extends under tension,
   (c2) a plurality of guide members for guiding said electrode wire under tension along a predetermined path which extends between said supply and take-up members and which traverses a machining region into which a workpiece for electroerosion machining is introduced in an electroerosion machining relationship with said electrode wire,
   (c3) wire driving means for advancing said electrode wire along said path from said supply member to said take-up member,
   (c4) a carriage arranged to be rotatably supported on said tool arm and to carry said base member and a support member, said support member including as a part thereof at least some of said guide members at predetermined locations along said path,
   (c5) carriage rotation means secured to said carriage for enabling said carriage, when rotatably supported in said tool arm, to be rotated relative to that tool arm in a manner such as will avoid mechanical interference of any part of said support member with said workpiece when said electrode wire and said workpiece are transversely moved relative to each other along a predetermined machining course;
(d) a tool storage magazine for storing, when in operation, at diverse storage locations thereon diverse electroerosion tool electrodes for performing different machining operations, said diverse electrodes including one constituted by at least said base and support members of said assembly and the associated wire guiding and handling parts carried by said member; and
(e) an automatic tool changing means for transferring tool electrodes between said tool arm and said storage magazine whereby to effect as required for different machining operations replacement of a tool electrode carried by said tool arm by another tool electrode transferred from said storage magazine and storage in said storage magazine of the tool electrode removed from said tool arm.

8. A method of electroerosion machining a workpiece comprising the steps of:
(a) advancing a travelling-wire electrode under tension between wire supply and take-up members along a path which is defined by guide members at least some of which are carried on a rotatably support member and which path traverses a machining region in which a workpiece for electroerosion machining is positioned in electroerosion machining relationship with a stretch of said wire electrode which is supported by said guide members carried by said support member;
(b) transversely displacing said wire electrode and said workpiece relative to each other along a predetermined machining course and energizing said wire electrode and said workpiece whereby to effect electroerosion machining; and
(c) rotating said support member as required during machining operations whereby to alter the angular orientation of said wire electrode path relative to said workpiece in a manner such as to avoid mechanical interference of any part of said support member with said workpiece.

9. An electroerosion machine comprising:
a column;
a tool arm carried by said column to be vertically displaceable relative thereto;
a carriage rotatably carried by said tool arm;
a tool storage magazine carrying diverse electroerosion tool electrodes including at least one unit of a base member and a support member of an electrode assembly, which assembly comprises: said base member carrying thereon a wire-electrode supply member and a wire-electrode take-up member, a plurality of guide members for guiding under tension between said supply and take-up members a travelling-wire electrode along a predetermined path including a machining region which is, in the use of the assembly, comprised of the travelling-wire electrode and a workpiece juxtaposed therewith in the presence of a machining medium, a carriage adapted to be coupled rotatably to an arm member mounted for displacement on the electroerosion machine, said carriage carrying said base member and including said support member carrying at least some of said guide members at predetermined locations, wire drive means for advancing said wire electrode from said supply member to said take-up member along said predetermined path, and rotary means operable in response to a control signal for rotating said carriage to control the angular position thereof relative to said arm member in a manner such as will avoid mechanical interference of any part of said support member with said workpiece; and
an automatic tool changer for successively transferring and replacing said diverse tool electrodes in said magazine for successive machining operations.

10. An electroerosion machine for cutting a desired contour in a projected edge or overhang portion of a workpiece with an axially-travelling elongate electrode, comprising:
workpiece support means for retaining a workpiece;
rotatable electrode carriage means having an upper and a lower electrode guidance member for guiding the axially-travelling elongate electrode linearly therebetween in an electroerosive cutting relationship with the workpiece;

translational drive means for relatively displacing said carriage means and said workpiece support means in an essentially horizontal plane to transversely move the axially-travelling elongate electrode between said upper and lower guidance members in said portion of the workpiece along a predetermined cutting path prescribed to correspond to a desired contour; and rotary drive means for rotating said electrode carriage means about an essentially vertical rotary axis and in such a manner as to avoid a collision of any part of said electrode carriage means with said workpiece as it may occur while the elongate electrode and the workpiece are transversely moved relative to each other along said predetermined cutting path.

11. The machine defined in claim 10 wherein said rotary axis is arranged to coincide with the axis of the elongate electrode on at least one point in an electroerosive cutting region between said electrode guidance members.

12. The machine defined in claim 11 wherein said rotary axis is arranged to coincide with the axis of the elongate electrode on said point in a horizontal reference plane prescribed in said workpiece.

13. The machine defined in claim 11 wherein said rotary axis is arranged to substantially coincide with the axis of the elongate electrode between said upper and lower guidance members.

14. The machine defined in claim 10 wherein said rotary axis is arranged to be substantially parallel to, and offset at a prescribed distance, from the axis of the elongate electrode between said upper and lower guidance members.

15. The machine defined in claim 10, further comprising means for controlledly adjusting the vertical position of said electrode carriage means to establish a prescribed vertical position of an electroerosive cutting region between said upper and lower electrode guidance members.

16. The machine defined in claim 10 or claim 15 wherein said upper and lower electrode guidance members are fixed in position relative to each other and are jointly rotatable by said rotary drive means.

17. The machine defined in claim 10, further comprising probe means associated with said carriage means for detecting the presence of said workpiece in predetermined close proximity with said any part to produce a rotary drive signal for rotating said carriage means with said rotary drive means.

* * * * *